US011736985B2

(12) United States Patent
Lin (10) Patent No.: US 11,736,985 B2
(45) Date of Patent: Aug. 22, 2023

(54) METHOD FOR COMMUNICATION BETWEEN IAB NODES IN ALTERNATING BIDIRECTIONAL MODE, ALLOWING COMMUNICATION MULTIPLEXING

(71) Applicant: ORANGE, Issy-les-Moulineaux (FR)

(72) Inventor: Hao Lin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/286,149

(22) PCT Filed: Oct. 8, 2019

(86) PCT No.: PCT/FR2019/052382
§ 371 (c)(1),
(2) Date: Apr. 16, 2021

(87) PCT Pub. No.: WO2020/079348
PCT Pub. Date: Apr. 23, 2020

(65) Prior Publication Data
US 2021/0360482 A1 Nov. 18, 2021

(30) Foreign Application Priority Data

Oct. 17, 2018 (FR) ...................................... 1859588

(51) Int. Cl.
*H04W 28/26* (2009.01)
*H04L 5/16* (2006.01)
*H04W 56/00* (2009.01)

(52) U.S. Cl.
CPC ............... *H04W 28/26* (2013.01); *H04L 5/16* (2013.01); *H04W 56/0045* (2013.01)

(58) Field of Classification Search
None
See application file for complete search history.

(56) References Cited

U.S. PATENT DOCUMENTS

| 2005/0136835 A1* | 6/2005 | Suwa | H04B 7/2681 |
| | | | 455/11.1 |
| 2013/0215814 A1* | 8/2013 | Lee | H04L 5/0048 |
| | | | 370/312 |
| 2019/0349871 A1* | 11/2019 | Ghosh | H04B 7/155 |

OTHER PUBLICATIONS

English translation of the Written Opinion of the International Searching Authority dated Mar. 9, 2020 for corresponding International Application No. PCT/FR2019/052382, filed Oct. 8, 2019.

(Continued)

*Primary Examiner* — Yemane Mesfin
*Assistant Examiner* — Jeff Banthrongsack
(74) *Attorney, Agent, or Firm* — David D. Brush; Westman, Champlin & Koehler, P.A.

(57) ABSTRACT

Integrated Access and Backhaul (IAB) nodes communicate with one another in half-duplex mode. Such a multiplexing of the communications of the IAB node requires simultaneous execution of a "mobile terminal" function and of a "base station" function by the IAB node. However, these two functions are not synchronised with one another, resulting in a lack of temporal alignment between the data communicated with the parent node and the data communicated with the child node, which causes interference that negatively impacts the quality of the communications between the different IAB nodes involved. Existing solutions suffer from long data processing times and are expensive. Accordingly, a time offset is introduced during the processing of the data by the child node, in order to take into account the lack of synchronisation between the "mobile terminal" function and the "base station" function of the current node.

10 Claims, 4 Drawing Sheets

(56) References Cited

OTHER PUBLICATIONS

French Search Report dated Jul. 10, 2019 for corresponding French Application No. 1859588, filed Oct. 17, 2018.
Written Opinion dated Jul. 10, 2019 for corresponding French Application No. 1859588, filed Oct. 17, 2018.
International Search Report dated Feb. 17, 2020 for corresponding International Application No. PCT/FR2019/052382, filed Oct. 8, 2019.
Written Opinion of the International Searching Authority dated Feb. 17, 2020 for corresponding International Application No. PCT/FR2019/052382, filed Oct. 8, 2019.

* cited by examiner

METHOD FOR COMMUNICATION BETWEEN IAB NODES IN ALTERNATING BIDIRECTIONAL MODE, ALLOWING COMMUNICATION MULTIPLEXING

CROSS-REFERENCE TO RELATED APPLICATIONS

This Application is a Section 371 National Stage Application of International Application No. PCT/FR2019/052382, filed Oct. 8, 2019, which is incorporated by reference in its entirety and published as WO 2020/079348 A1 on Apr. 23, 2020, not in English.

1. FIELD OF THE INVENTION

The field of invention is that of the deployment of cellular networks within the context of 5G or $5^{th}$ generation standards for mobile telephony. More specifically, the invention relates to cellular network architectures known as IAB (Integrated Access and Backhaul).

2. PRIOR ART AND THE DRAWBACKS THEREOF

In order to meet a growing demand for high throughput, the communication techniques used within the scope of 5G are based on the use of wide frequency bands in the frequency spectrum comprised between 30 and 300 GHz. Use of these high frequencies has an impact on the radio transmission range of the base stations, which is reduced as a result. This leads to a densified distribution of the base stations in order to compensate for this reduction in the range of the radio transmissions.

In order to meet this need to densify the distribution of the base stations, various cellular network architectures are proposed. These cellular network architectures include the IAB architecture.

Figure 1:
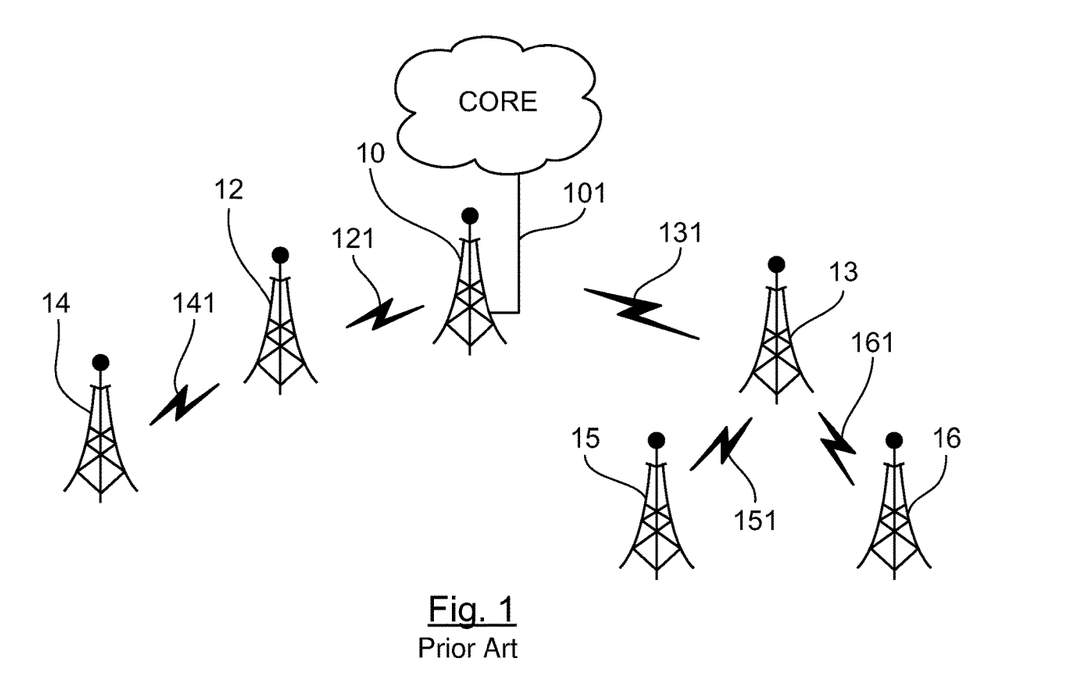
FIG. 1 shows an IAB architecture according to the prior art.

FIG. 1 shows such an IAB architecture. Such an architecture comprises a first IAB node 10, referred to as the donor node. The donor node 10 is connected to the core network CORE by means of a wired-type link 101. In the example shown in FIG. 1, the donor node 10 is connected to two other IAB nodes, node 12 and node 13, by means of radio links 121 and 131 respectively.

The node 12 is connected to another IAB node, node 14, by means of a radio link 141. The node 13 is connected to another IAB node, node 15, by means of a radio link 151. Finally, the node 15 is connected to another IAB node, node 16, by means of a radio link 161.

Thus, the node 10 acts as a parent for the nodes 12 and 13, which in turn act as a parent for the nodes 14 and 15 respectively. Finally, the node 15 acts as a parent for the node 16.

An IAB node includes two functions, a so-called "base station" function and a so-called "mobile terminal" function. When an IAB node, such as the node 12, for example, communicates with the parent node thereof, in this case the node 10, the "mobile terminal" function is activated and the node 12 acts as a mobile terminal with respect to the node 10. When the node 12 communicates with the child node thereof, in this case the node 14, the "base station" function is activated and the node 12 acts as a base station with respect to the node 14.

Thus, depending on the nature of the link connecting it to the IAB node with which it communicates, an IAB node performs either a base station function or a mobile terminal function.

When the "base station" function is activated in an IAB node, the latter controls the downlink transmission channels, i.e. the channels used to transmit data from the parent IAB node to the child node, and the uplink transmission channels, i.e. the channels used to transmit data from the child IAB node to the parent node, of the child IAB nodes thereof. A child node receives scheduling signals transmitted by the parent node thereof which in particular carry information regarding data transmission times and/or receipt times to or from the child node, as well as the duration of these transmissions.

The IAB nodes communicate with one another in half-duplex mode. In other words, an IAB node cannot simultaneously receive data transmitted by the parent node thereof and transmit data to the child node thereof, or vice versa.

However, an IAB node can simultaneously receive data transmitted by the parent node thereof and by the child node thereof, or simultaneously transmit data to the parent node thereof and to the child node thereof.

Such a multiplexing of the communications of the IAB node requires the simultaneous execution of the "mobile terminal" function and of the "base station" function by the IAB node. However, these two functions are not synchronised with one another, resulting in a lack of temporal alignment between the data communicated with the parent node and the data communicated with the child node, which causes interference that negatively impacts the quality of the communications between the different IAB nodes involved.

One solution to this problem is to include two baseband processing units, a first baseband processing unit processing the data to be transmitted to the parent node and a second baseband processing unit processing the data to be transmitted to the child node. Each of the baseband processing units processes its data according to its own transmission times.

The IAB node further includes an interference processing module that is used to decode data received, for example, from the parent node, subtract it from the received signal in which the data transmitted by the parent node and the child node are aggregated, and then decode the data transmitted by the child node.

Such a solution suffers from a long data processing time, both when processing the data transmitted by the IAB node and when processing the data received by the IAB node. Moreover, the IAB nodes must include two baseband processing units as well as an interference processing module. This has a negative impact on the structure of such an IAB node and on the cost thereof.

There is thus a need for a technique that allows for the multiplexing of the communications of an IAB node that does not suffer from all or some of the aforementioned drawbacks.

3. DESCRIPTION OF THE INVENTION

The invention relates to a method for communicating data between a current node, a parent node of the current node and a child node of the current node communicating with one another in half-duplex mode, the communication method being implemented by the current node and comprising the following steps of:

receiving a reservation request, transmitted by the parent node, for at least one time slot for accessing a communication channel established between the parent node and the current node, the reserved time slot being associated with a first communication direction, determining a value of a time offset intended to be used by the child node to adjust a data communication time with the current node, the adjustment of the communication time allowing said data to be communicated between the current node and the child node during the reserved time slot, transmitting said time offset value and a second communication direction to the child node, when said time offset value is not zero, simultaneously communicating data with the parent node and the child node during the reserved time slot respectively in the first communication direction and in the second communication direction.

The solution proposed by the invention consists in introducing a time offset during the processing of the data by the child node, in order to take into account the lack of synchronisation between the "mobile terminal" function and the "base station" function of the current node.

Such a solution does not require the incorporation of additional interference processing modules or baseband processing units into an IAB node. Moreover, the incorporation of a time offset to allow for the multiplexing of the communications of the current node results in low-complexity data processing. Thus, the data processing time by the IAB node is little or not at all impacted by the implementation of the solution.

According to one embodiment of the communication method, when the time offset value is zero, simultaneous data communication with the parent node and the child node during the reserved time slot is not possible.

A time offset value of zero does not mean that the "base station" and "mobile terminal" functions are synchronous. A time offset value of zero means that the IAB node has determined that the conditions for multiplexing communications are not met. This is, for example, the case when the reservation transmitted by the parent node is received by the child node too late for the child node to schedule a communication with the grandchild node within the reserved time slot.

According to one embodiment of the communication method, wherein the first communication direction corresponds to a data transmission by the parent node to the current node and the second communication direction corresponds to a data transmission by the child node to the current node, the method further comprises a step of transmitting, to the child node, a value of a data propagation delay between the child node and the current node intended to be used by the child node with said time offset value in order to adjust the time of the data transmission to the current node.

The current node informs the child node that it must change a data transmission time as a function of the time offset in order to take into account the lack of synchronisation between the "mobile terminal" and "base station" functions of the current node, but also as a function of the data propagation delay between the child node and the current node to ensure that the data transmission is carried out at a time that allows the data to be received by the current node at the same moment in time as the data transmitted by the parent node.

According to one embodiment of the communication method, wherein the first communication direction corresponds to a data transmission by the current node to the parent node and the second communication direction corresponds to a data transmission by the current node to the child node, the method further comprises a step of receiving a value of a data propagation delay between the current node and the parent node, transmitted by the parent node, intended to be used by the current node in order to adjust the time of the data transmission to the parent node.

The current node is informed by the parent node that it must change a data transmission time as a function of the data propagation delay between the current node and the parent node in order to ensure that the data transmission is carried out at a time that allows the data to be received by the parent node at a time scheduled thereby.

The invention secondly relates to a method for communicating data between a child node and a current node communicating with one another in half-duplex mode, the communication method being implemented by the child node and comprising the following steps of:

receiving, from a current node, a message comprising a communication direction and comprising a value of a time offset intended to be used by the child node to adjust a data communication time with the current node, the adjustment of the communication time allowing said data to be communicated between the current node and the child node during a reserved time slot, determining the data communication time with the current node by way of said time offset value when said time offset value is not zero, communicating data with the current node during the reserved time slot in the communication direction.

According to one embodiment of the communication method, wherein the communication direction corresponds to a data transmission by the child node to the current node, the communication method further comprises steps of:

receiving a value of a data propagation delay between the child node and the current node, determining the time of the data transmission to the current node by way of said time offset value and of said value of the propagation delay.

According to one embodiment of the communication method, wherein the communication direction corresponds to a data transmission by the current node to the child node, the communication method further comprises steps of:

determining the time of receipt of data transmitted by the current node by way of said time offset value.

The invention further relates to communication equipment capable of communicating with a parent communication equipment item and a child communication equipment item in a half-duplex mode, the communication equipment comprising:

means for receiving a reservation request, transmitted by the parent communication equipment, for at least one time slot for accessing a communication channel established between the parent communication equipment and the communication equipment, the reserved time slot being associated with a first communication direction, means for determining a value of a time offset intended to be used by the child communication equipment to adjust a data communication time with the communication equipment, the adjustment of the communication time allowing said data to be communicated between the communication equipment and the child communication equipment during the reserved time slot, means for transmitting said time offset value and a second communication direction to the child communication equipment, means for simultaneously communicating data with the parent communication equipment and the child communication equipment during the reserved time slot respectively in the first communication direction and in the second communication direction when said time offset value is not zero.

Another purpose of the invention relates to a communication equipment item, referred to as a child equipment item, capable of communicating with a communication equipment item in half-duplex mode, the child communication equipment comprising:

means for receiving, from the communication equipment, a message comprising a communication direction and comprising a value of a time offset intended to be used by the child communication equipment to adjust a data communication time with the communication equipment, the adjustment of the communication time allowing said data to be communicated between the communication equipment and the child communication equipment during a reserved time slot, means for determining the data communication time with the communication equipment by way of said time offset value when said time offset value is not zero, means for communicating data with the communication equipment during the reserved time slot in the communication direction.

Finally, the invention relates to computer program products comprising program code instructions for implementing methods as described hereinabove, when they are executed by a processor.

The invention further relates to a computer-readable recording medium on which are recorded computer programs comprising program code instructions for executing the steps of the methods according to the invention as described hereinabove.

Such a recording medium can be any entity or device capable of storing the programs. For example, the medium can include a storage means, such as a ROM, for example a CD-ROM or a microelectronic circuit ROM, or even a magnetic recording means, for example a USB stick or a hard drive.

On the other hand, such a recording medium can be a transmittable medium such as an electric or optical signal, which can be carried via an electric or optical cable, by radio, or by other means, such that the computer programs contained therein can be executed remotely. The programs according to the invention can in particular be downloaded from a network, for example the Internet network.

Alternatively, the recording medium can be an integrated circuit into which the programs are incorporated, the circuit being suitable for executing or for use in the execution of the aforementioned methods of the invention.

4. LIST OF FIGURES

Other purposes, features and advantages of the invention will be better understood upon reading the following description, which is given as a rough guide and in no way as a limited guide, with reference to the accompanying figures, in which.

5. DETAILED DESCRIPTION OF THE EMBODIMENTS OF THE INVENTION

Figure 2:
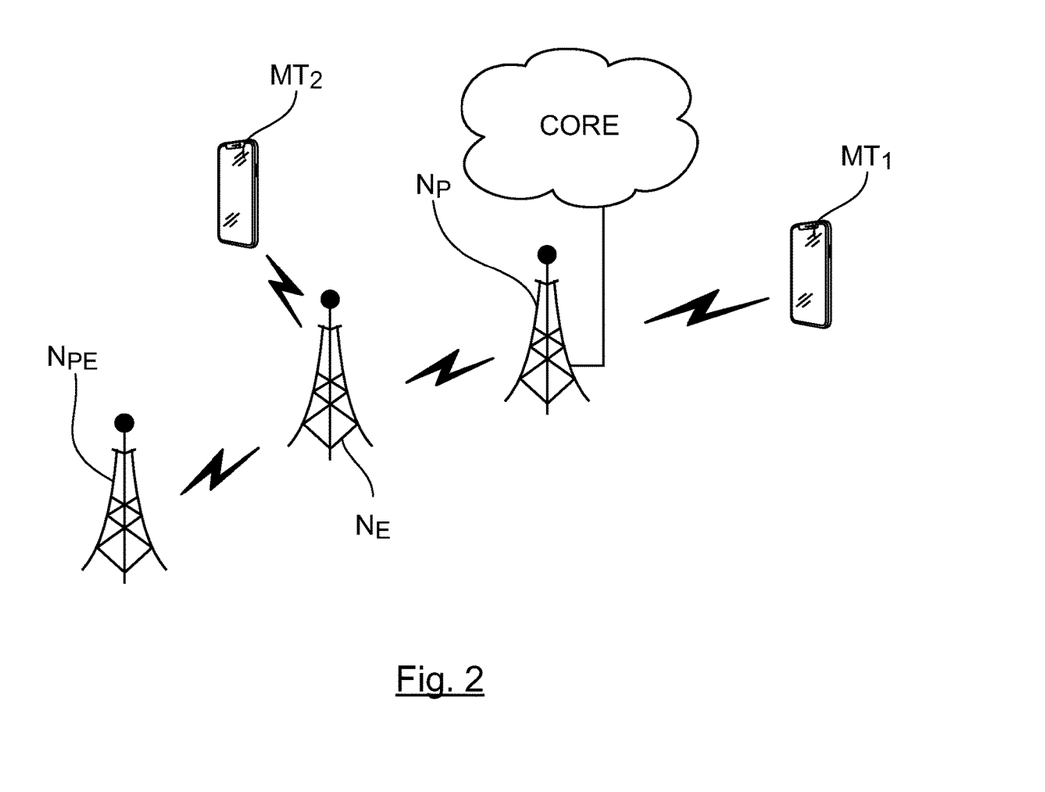
FIG. 2 shows a simplified IAB architecture in which the invention is implemented according to the various embodiments thereof.

FIG. 2 shows a simplified IAB architecture in which the invention is implemented according to the various embodiments thereof.

In this simplified architecture, a first IAB node, referred to as a parent node $N_P$ is connected by means of a wired connection to the core network CORE. The parent node $N_P$ is connected to a child IAB node $N_E$ and the child node is connected to a grandchild IAB node $N_{PF}$. The child node $N_E$ is a parent node for the grandchild node $N_{PE}$. A first mobile terminal $MT_1$ is attached to the parent node $N_P$ which acts as a base station for the mobile terminal $MT_1$. A second mobile terminal $MT_2$ is attached to the child node $N_E$ which acts as a base station for the mobile terminal $MT_2$.

Figure 3:
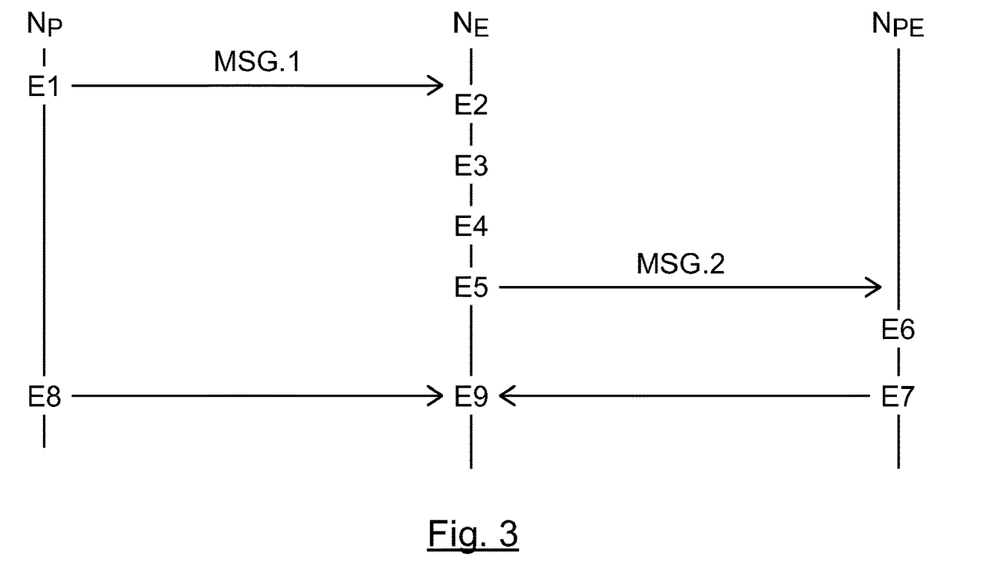
FIG. 3 shows the various steps implemented when executing the communication method according to a first embodiment of the invention.

FIG. 3 shows the various steps implemented when executing the communication method according to a first embodiment of the invention. The child node $N_E$ has activated the "mobile terminal" function and the "base station" function. The "base station" function of the child node $N_E$ is thus synchronised with the "base station" function of the parent node $N_P$. In this first embodiment, the child node $N_E$ simultaneously receives data from the parent node $N_P$ and from the grandchild node $N_{PE}$.

Figure 4:
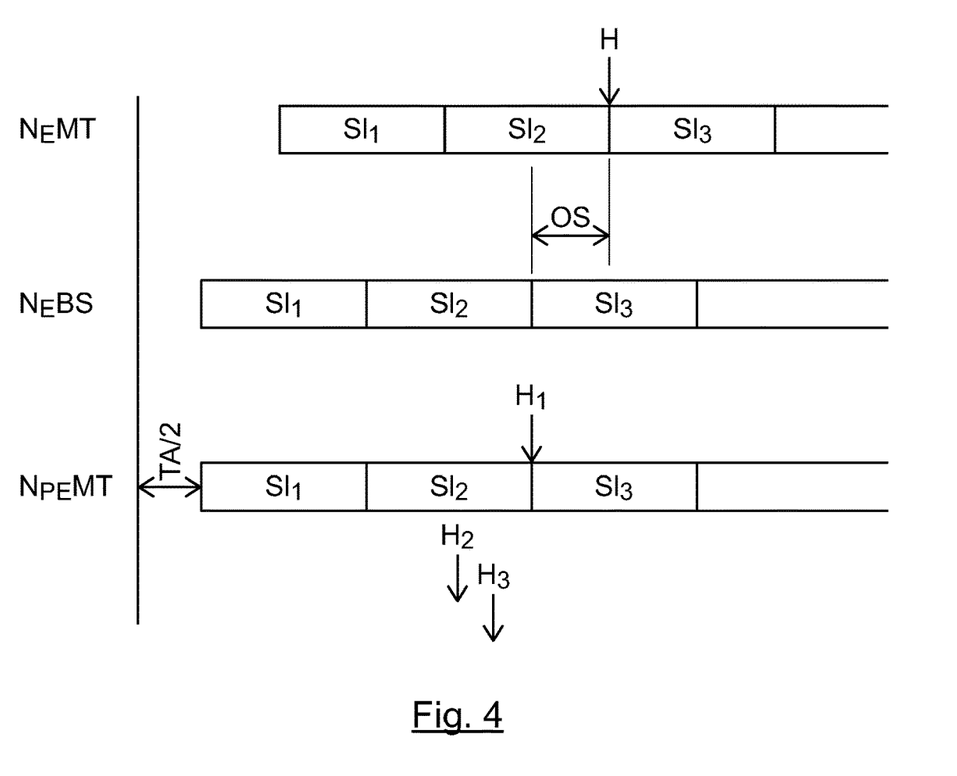
FIG. 4 shows the breakdown into time slots $SI_n$, where n is a natural number, of a communication channel established between the child node $N_E$ and the parent node $N_P$ according to the first embodiment of the invention.

FIG. 4 shows the breakdown into time slots $SI_n$, where n is a natural number, of a communication channel established between the child node $N_E$ and the parent node $N_P$. The breakdown into time slots $SI_n$ is carried out as a function of the clock associated with the "mobile terminal" function $N_E$ MT of the child node $N_E$ since it is by means of this function that the child node $N_E$ receives the data transmitted by the parent node $N_P$.

With reference to FIG. 3 and to FIG. 4, in a step E1, the child node $N_E$ receives a message MSG1 from the parent node $N_P$. The message MSG1 comprises a request for the reservation of at least one time slot, in this case the third time slot SI3, and a data transmission direction, in this case the transmission is a downlink transmission. The time slot SI3 is also associated with a transmission time H.

In a step E2, the child node $N_E$ determines whether it is possible to schedule the receipt of data transmitted by the grandchild node $N_{PE}$ at the same time as the time H associated with the time slot SI3.

If the child node $N_E$ determines that it is possible to schedule the receipt of data transmitted by the grandchild node $N_{PE}$ at the same time H as data are received from the parent node $N_P$, the child node $N_E$ determines a value of a time offset OS that exists between a clock associated with the "mobile terminal" function $N_E$ TM and a clock associated with the "base station" function $N_E$ BS of the child node in a step E3.

If the child node $N_E$ determines that it is not possible to schedule the receipt of data transmitted by the grandchild node $N_{PE}$ at the same time H as data are received from the parent node $N_P$, then the time offset value OS is zero.

A zero time offset value OS does not mean that the "base station" and "mobile terminal" functions of the child node $N_E$ are synchronous. A time offset value OS of zero means that the child node $N_E$ has determined that the conditions for multiplexing communications with the parent node $N_P$ and the grandchild node $N_{PE}$ are not met. This is, for example, the case when the reservation request transmitted by the parent node $N_P$ is received by the child node $N_E$ too late for it to schedule a communication with the grandchild node $N_{PE}$ in the reserved time slot.

When it is not zero, the time offset value OS is intended to be used by the grandchild node $N_{PE}$ to adjust a time $H_3$ for the data transmission with the child node $N_E$, the adjustment of the transmission time allowing for communication of said data between the child node $N_E$ and the grandchild node $N_{PE}$ at the time H associated with the time slot SI3 reserved by the parent node $N_P$.

In an optional step E4, the child node $N_E$ determines a value of a data propagation delay TA/2 between the child node $N_E$ and the grandchild node $N_{PE}$ intended to be used by the grandchild node $N_{PE}$ with the time offset value OS to adjust the time for the data transmission to the child node $N_E$. Such a step is optional, since the grandchild node $N_{PE}$ can already know this value.

In a step E5, the child node $N_E$ transmits a message MSG2 to the grandchild node $N_{PE}$ comprising the time offset value OS, a data transmission direction, in this case the transmission is an uplink transmission, and optionally the value of the data propagation delay TA/2 determined in step E4.

In a step E6, the grandchild node $N_{PE}$ determines the time $H_3$ of data transmission to the child node $N_E$. The data transmission time $H_3$ is obtained by correcting a theoretical data transmission time $H_1$ of the time slot SI3 of a transmission channel established between the grandchild node $N_{PE}$ and the child node $N_E$ by means of the value of the data propagation delay TA/2. A new data transmission time $H_2$ is determined by offsetting the theoretical data transmission time $H_1$ in time by the value of the data propagation delay TA/2. Thus, the data transmission time $H_2$ occurs before the theoretical data transmission time $H_1$ by a period of time corresponding to the value of the data propagation delay TA/2. The time $H_3$ of data transmission to the child node $N_E$ is finally obtained by adding the time offset value OS to the data transmission time $H_2$. Thus, the data transmission time $H_3$ occurs before the theoretical data transmission time $H_1$ but after the data transmission time $H_2$.

In a step E7, the grandchild node $N_{PE}$ transmits the data to the child node $N_E$ at the data transmission time $H_3$, thus ensuring that the data are received at the moment in time H by the child node $N_E$ in a step E9.

In a step E8, the parent node $N_P$ transmits the data to the child node $N_E$, in accordance with the resource reservation made in step E1, thus ensuring that the data are received at the moment in time H by the child node $N_E$ in step E9.

Figure 5:
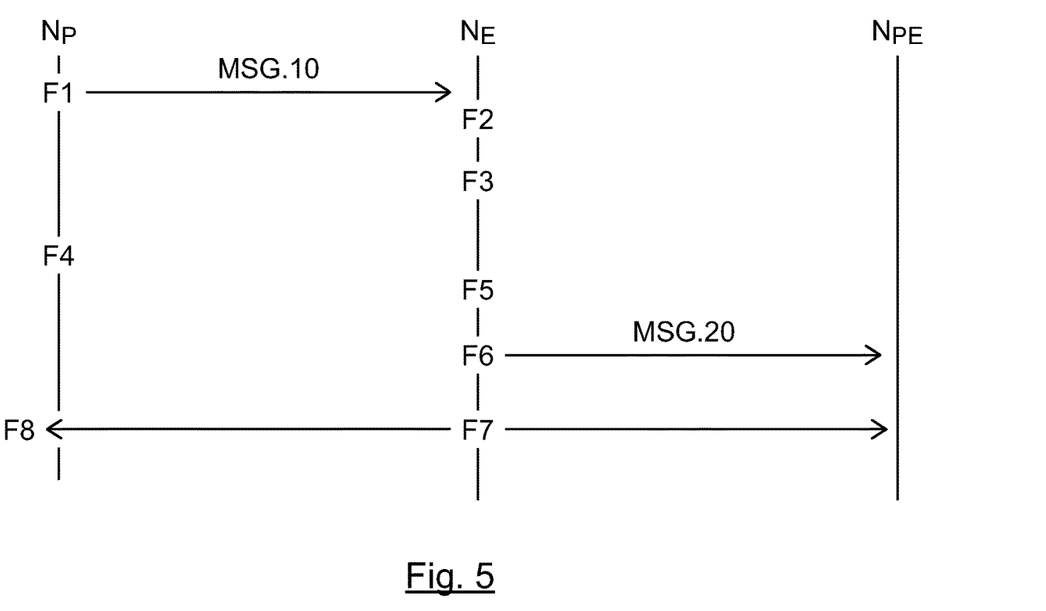
FIG. 5 shows the various steps implemented when executing the communication method according to a second embodiment of the invention.

FIG. 5 shows the various steps implemented when executing the communication method according to a second embodiment of the invention. The child node $N_E$ has activated the "mobile terminal" function and the "base station" function. The "base station" function of the child node $N_E$ is thus synchronised with the "base station" function of the parent node $N_P$. In this second embodiment, the child node $N_E$ simultaneously transmits data to the parent node $N_P$ and to the grandchild node $N_{PE}$.

Figure 6:
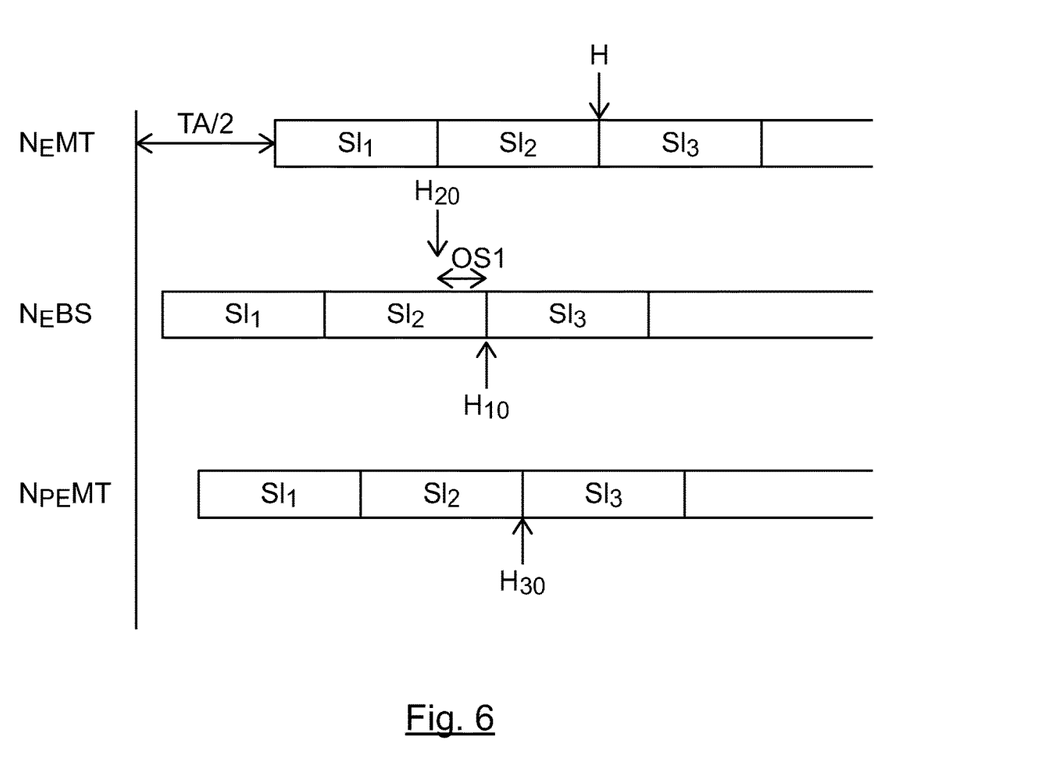
FIG. 6 shows the breakdown into time slots $SI_n$, where n is a natural number, of a communication channel established between the child node $N_E$ and the parent node $N_P$ according to the second embodiment of the invention.

FIG. 6 shows the breakdown into time slots $SI_n$, where n is a natural number, of a communication channel established between the child node $N_E$ and the parent node $N_P$. The breakdown into time slots $SI_n$ is carried out as a function of the clock associated with the "mobile terminal" function $N_E$ MT of the child node $N_E$ since it is by means of this function that the child node $N_E$ receives the data transmitted by the parent node $N_P$.

With reference to FIG. 5 and to FIG. 6, in a step F1, the child node $N_E$ receives a message MSG10 from the parent node $N_P$. The message MSG10 comprises a request for the reservation of at least one time slot, in this case the third time slot SI3, and a data transmission direction, in this case the transmission is an uplink transmission. The time slot SI3 is also associated with a transmission time H.

In a step F2, the child node $N_E$ determines whether it is possible to schedule the transmission of data to the grandchild node $N_{PE}$ at the same time as the time H associated with the time slot SI3.

If the child node $N_E$ determines that it is possible to schedule the transmission of data to the grandchild node $N_{PE}$ at the same time H as data are transmitted to the parent node $N_P$, the child node $N_E$ determines a value of a time offset OS1 that exists between a clock associated with the "mobile terminal" function $N_E$ TM and a clock associated with the "base station" function $N_E$ BS of the child node in a step F3.

If the child node $N_E$ determines that it is not possible to schedule the transmission of data to the grandchild node $N_{PE}$ at the same time H as data are transmitted to the parent node $N_P$, then the time offset value OS1 is zero.

A time offset value OS1 of zero means that the child node $N_E$ has determined that the conditions for multiplexing communications with the parent node $N_P$ and the grandchild node $N_{PE}$ are not met. This is, for example, the case when the reservation request transmitted by the parent node $N_P$ is received by the child node $N_E$ too late for it to schedule a communication with the grandchild node $N_{PE}$ in the reserved time slot.

When it is not zero, the time offset value OS1 is intended to inform the grandchild node $N_{PE}$ of a time of receipt of the data transmitted by the child node $N_E$ which is offset from a theoretical data receipt time $H_{30}$ set beforehand. The offsetting of the transmission time by the child node $N_E$ allows said data to be transmitted between the child node $N_E$ and the grandchild node $N_{PE}$ at the time H associated with the time slot SI3 reserved by the parent node $N_P$.

In an optional step F4, the parent node $N_P$ determines a value of a data propagation delay TA/2 between the child node $N_E$ and the parent node $N_P$ intended to be used by the child node $N_E$ with the time offset value OS1 to adjust the time for the data transmission to the parent node $N_P$. Such a step is optional, since the child node $N_E$ can already know this value.

In a step F5, the child node $N_E$ determines the time $H_{20}$ of data transmission to the grandchild node $N_{PE}$. The data transmission time $H_{20}$ is obtained by correcting a theoretical data transmission time $H_{10}$ of the time slot SI3 corresponding to the "base station" function of the child node $N_E$ by means of the time offset value OS1. The data transmission time $H_{20}$ is determined by offsetting the theoretical data transmission time $H_{10}$ in time by the time offset value OS1. Thus, the data transmission time $H_{20}$ occurs before the theoretical data transmission time $H_{10}$ by a period of time corresponding to the time offset value OS1. Thus, the time $H_{20}$ of the data transmission to the grandchild node $N_{PE}$ occurs before the theoretical transmission time $H_{10}$. The time $H_{20}$ of the data transmission to the grandchild node $N_{PE}$ corresponds to the time H reserved by the parent node brought forward by the value of the data propagation delay TA/2 corrected by the time offset OS1.

In a step F6, the child node $N_E$ transmits a message MSG20 to the grandchild node $N_{PE}$ comprising the time offset value OS1, and a data transmission direction, in this case the transmission is a downlink transmission.

In a step F7, the child node $N_E$ transmits the data to the parent node $N_E$ at the transmission time H brought forward by the value of the data propagation delay TA/2, thus ensuring that the data are received at the moment in time H by the parent node $N_P$ in a step F8.

In step F7, the child node $N_E$ transmits data to the grandchild node $N_{PE}$ at the data transmission time $H_{20}$, ensuring that the data are transmitted so as to comply with the resource reservation made by the parent node in step F1. Given that the grandchild node $N_{PE}$ was informed of the early transmission of the data during step F6, it can process them correctly.

Figure 7:
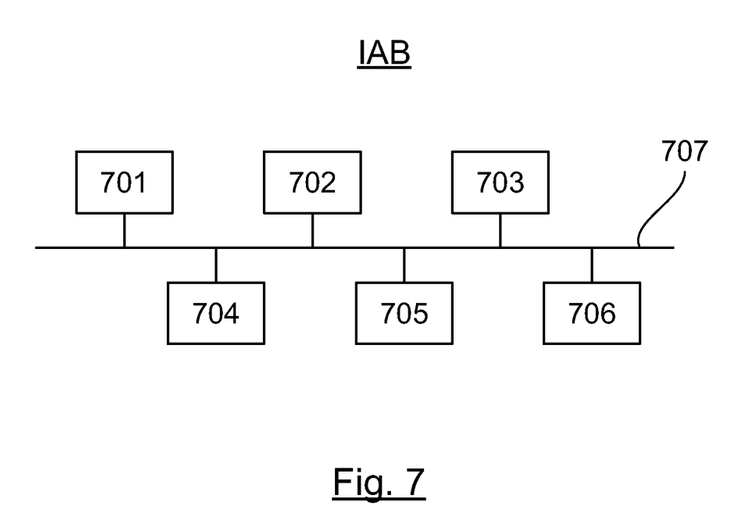
FIG. 7 shows an IAB node according to one embodiment of the invention.

FIG. 7 shows an IAB node according to one embodiment of the invention. Such an IAB node is capable of implementing all of the steps of the method described with reference to FIGS. 3 to 6 depending on whether it is a parent node, a child node or a grandchild node.

An IAB node can comprise at least one hardware processor 701, a storage unit 702, an input device 703, a display device 704, an interface 705, and at least one network interface 706 which are connected to one another via a bus 707. It goes without saying that the component elements of the IAB node can be connected by means of a connection that is different from a bus.

The processor 701 controls the operations of the IAB node. The storage unit 702 stores at least one program for implementing a communication method according to one embodiment of the invention to be executed by the processor 701, and various data, such as parameters used for computations carried out by the processor 701, and intermediate data for computations carried out by the processor 701, etc. The processor 701 can be formed by any known and suitable hardware or software, or by a combination of hardware and software. For example, the processor 701 can be formed by dedicated hardware such as a processing circuit, or by a programmable processing unit such as a central processing unit that executes a program stored in a memory thereof.

The storage unit 702 can be formed by any suitable means capable of storing the one or more programs and data in a computer-readable manner. Examples of a storage unit 702 comprise computer-readable non-transitory storage media such as solid-state memory devices and magnetic, optical or magneto-optical recording media loaded on a read/write unit.

The input device 703 can be formed by a keyboard, a pointing device such as a mouse to be used by a user to enter commands. The display device 704 can also be formed by a display module, such as a graphical user interface or GUI.

The interface 705 provides an interface between the IAB node and an external appliance such as a mobile terminal MT1. The interface 705 can communicate with the external appliance via a wireless connection.

At least one network interface 706 provides a connection between the IAB node and another IAB node via a radio connection. The network interface 706 can provide, where appropriate, a wired connection with the core network CORE.

The invention claimed is:

1. A communication method for communicating data between a current node, a parent node of the current node and a child node of the current node communicating with one another in half-duplex mode, said current node including a base station function and a mobile terminal function, said mobile terminal function being synchronized with a base station function included in the parent node, the communication method being implemented by the current node and comprising:

receiving a reservation request, transmitted by the parent node, for at least one time slot for accessing a communication channel established between the parent node and the current node, the reserved time slot being associated with a first communication direction, determining a value of a time offset to be used by the child node to adjust a data communication time with the current node, said time offset existing between a clock associated with the mobile terminal function and a clock associated with the base station function of the current node, the adjustment of the communication time allowing said data to be communicated between the current node and the child node during the reserved time slot, transmitting said time offset value and a second communication direction to the child node, and in response to said time offset value being not zero, simultaneously communicating data with the parent node and the child node during the reserved time slot respectively in the first communication direction and in the second communication direction.

2. The communication method according to claim 1 wherein, in response to the time offset value being zero, simultaneous data communication with the parent node and the child node during the reserved time slot is not possible.

3. The communication method according to claim 1 wherein, with the first communication direction corresponding to a data transmission by the parent node to the current node and the second communication direction corresponding to a data transmission by the child node to the current node, the method further comprises transmitting, to the child node, a value of a data propagation delay between the child node and the current node to be used by the child node with said time offset value in order to adjust the time of the data transmission to the current node.

4. The communication method according to claim 1 wherein, with the first communication direction corresponding to a data transmission by the current node to the parent node and the second communication direction corresponding to a data transmission by the current node to the child node, the method further comprises receiving a value of a data propagation delay between the current node and the parent node, transmitted by the parent node, to be used by the current node in order to adjust the time of the data transmission to the parent node.

5. A communication method for communicating data between a current node and a child node of the current node communicating with one another in half-duplex mode, said current node including a base station function and a mobile terminal function, the communication method being implemented by the child node and comprising:

receiving, from a current node, a message comprising a communication direction, a value of a data propagation delay between the child node and the current node and a value, determined by the current node, of a time offset to be used by the child node to adjust a data communication time with the current node, said time offset existing between a clock associated with the mobile terminal function and a clock associated with the base station function of the current node, the adjustment of the communication time allowing said data to be communicated between the current node and the child node during a reserved time slot, in response to said time offset value being not zero, determining the time of data communication with the current node by adding the value of the time offset at a first time by offsetting a theorical communication time with the value of a data propagation delay between the child node and the current node, and communicating data with the current node during the reserved time slot in the communication direction at the communication time previously determined.

6. The communication method according to claim 5 wherein, with the communication direction corresponding to a data transmission by the current node to the child node, the communication method further comprises:

determining the time of receipt of data transmitted by the current node by way of said time offset value.

7. Communication equipment capable of communicating with a parent communication equipment and a child communication equipment in a half-duplex mode, said communication equipment including a base station function and a mobile terminal function, said mobile terminal function being synchronized with a base station function included in the parent communication equipment, the communication equipment comprising:

a processor; and a non-transitory computer-readable medium comprising instructions stored thereon which when executed by the processor configure the communication equipment to:
receive a reservation request, transmitted by the parent communication equipment, for at least one time slot for accessing a communication channel established between the parent communication equipment and the communication equipment, the reserved time slot being associated with a first communication direction, determine a value of a time offset to be used by the child communication equipment to adjust a data communication time with the communication equipment, said time offset existing between a clock associated with the mobile terminal function and a clock associated with the base station function of the communication equipment, the adjustment of the communication time allowing said data to be communicated between the communication equipment and the child communication equipment during the reserved time slot, transmit said time offset value and a second communication direction to the child communication equipment, and simultaneously communicating data with the parent communication equipment and the child communication equipment during the reserved time slot respectively in the first communication direction and in the second communication direction in response to said time offset value being not zero.

8. Communication equipment, referred to as child equipment, capable of communicating with a communication equipment, referred to as current equipment, in half-duplex mode, said current equipment including a base station function and a mobile terminal function, the child communication equipment comprising:

a processor; and a non-transitory computer-readable medium comprising instructions stored thereon which when executed by the processor configure the child communication equipment to:

receive, from the current communication equipment, a message comprising a communication direction, a value of a data propagation delay between the child node and the current node and a value of a time offset to be used by the child communication equipment to adjust a data communication time with the current communication equipment, said time offset existing between a clock associated with the mobile terminal function and a clock associated with the base station function of the current equipment, the adjustment of the communication time allowing said data to be communicated between the current communication equipment and the child communication equipment during a reserved time slot, determine the data communication time with the current communication equipment when said time offset value is not zero by adding the value of the time offset at a first time by offsetting a theorical communication time with the value of a data propagation delay between the child node and the current node, and communicate data with the current communication equipment during the reserved time slot in the communication direction at the communication time previously determined.

9. A non-transitory computer-readable medium comprising a computer program product stored thereon comprising program code instructions for implementing a method of communicating data between a current node, a parent node of the current node and a child node of the current node, when the instructions are executed by a processor of the current node, the current node, the parent node and the child node communicating with one another in half-duplex mode, said communication equipment including a base station function and a mobile terminal function, said mobile terminal function being synchronized with a base station function included in the parent communication equipment, wherein the instructions configure the current node to:

receive a reservation request, transmitted by the parent node, for at least one time slot for accessing a communication channel established between the parent node and the current node, the reserved time slot being associated with a first communication direction, determine a value of a time offset to be used by the child node to adjust a data communication time with the current node, said time offset existing between a clock associated with the mobile terminal function and a clock associated with the base station function of the communication equipment, the adjustment of the communication time allowing said data to be communicated between the current node and the child node during the reserved time slot, transmit said time offset value and a second communication direction to the child node, and in response to said time offset value being not zero, simultaneously communicate data with the parent node and the child node during the reserved time slot respectively in the first communication direction and in the second communication direction.

10. A non-transitory computer-readable medium comprising a computer program product stored thereon comprising program code instructions for implementing a method of communicating data between a child node and a current node, when the instructions are executed by a processor of the child node, the child node and the current node communicating with one another in half-duplex mode, said current equipment including a base station function and a mobile terminal function, wherein the instructions configure the child node to:
- receive, from a current node, a message comprising a communication direction, a value of a data propagation delay between the child node and the current node and a value of a time offset to be used by the child node to adjust a data communication time with the current node, said time offset existing between a clock associated with the mobile terminal function and a clock associated with the base station function of the current equipment, the adjustment of the communication time allowing said data to be communicated between the current node and the child node during a reserved time slot,
- in response to said time offset value being not zero, determine the time of data communication with the current node by adding the value of the time offset at a first time by offsetting a theorical communication time with the value of a data propagation delay between the child node and the current node, and
- communicate data with the current node during the reserved time slot in the communication direction at the communication time previously determined.

* * * * *